United States Patent Office 2,981,750
Patented Apr. 25, 1961

2,981,750

N-NITRO-N-TRINITROALKYLAMINO ALCOHOLS AND DERIVATIVES THEREOF

Henry Feuer, Lafayette, Ind., and William A. Swarts, Chicago, Ill., assignors to Purdue Research Foundation, Lafayette, Ind., a corporation of Indiana No Drawing. Filed Feb. 2, 1959, Ser. No. 790,377

10 Claims. (Cl. 260—467)

Our invention relates to novel nitro compounds and more particularly it relates to N-nitro-N-trinitroalkylamino nitrates, and to a process for producing same.

Our new compounds are represented by the following structural formula:

$$R^1-\underset{R^4}{\underset{|}{\overset{R^2}{\overset{|}{C}}}}-R$$

wherein

R is $-N(NO_2)-R^1-C(NO_2)_3$, $R^1$ is —CH—, 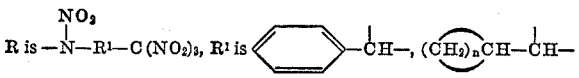

or alkylene having up to five carbon atoms, $R^2$ is nitratoalkyl having up to five carbon atoms; $R^3$ is hydrogen, or alkyl having up to five carbon atoms; $R^4$ is hydrogen, alkyl having up to five carbon atoms, R substituted alkyl, nitratoalkyl having up to ten carbon atoms or R- and nitrato- substituted alkyl having up to ten carbon atoms; and $n$ is a number from three to nine.

Compounds which come within the above structural formula include: 2-[N-nitro-N - (2,2,2 - trinitroethyl) amino]ethyl nitrate, 3-[N-nitro - N - (2,2,2-trinitroethyl) amino] - 1 - propyl nitrate, 2-methyl-2-[N-nitro-N-(2,2,2-trinitroethyl)amino] - 1,3-propyl dinitrate, 2-[N-nitro-N- (2,2,2-trinitroethyl)amino] - 1,4 - butyl dinitrate, 2,3-bis [N-nitro-N-(2,2,2 - trinitroethyl)amino] - 1,4-butyl dinitrate, 2-propyl - 2 - [N-nitro-N-(1-phenyl-1-trinitromethylethyl)amino] - 1,3-propyl dinitrate, 3-methyl - 3- [N-nitro-N-(1 - cyclohexyl - 2,2,2-trinitroethyl)amino] heptyl nitrate, 6-[N-nitro - N-(2,2,2-trinitroethyl)amino] 1-undecyl nitrate, 2-[N-nitro-N-(1-trinitromethylbutyl) amino] - 1 - pentyl nitrate, 2,6-bis[N-nitro-N-(1-phenyl-2,2,2 - trinitroethyl)amino] - 1,7 - heptyl dinitrate, 2,4- bis[N-nitro-N(1-cyclopentyl - 2,2,2-trinitroethyl)amino]- 2 - ethyl-1-hexyl nitrate, 3,5,9,11-tetra[N-nitro-N-(2,2,2-trinitroethyl)amino] - 5,9 - tridecyl dinitrate, 2-(4-nitratobutyl) - 2,4 - bis [N-nitro-N-(2,2,2-trinitroethyl)amino] 1-hexyl nitrate, 2,9 - diethyl-2,4,7,9-tetra[N-nitro-N-(1-trinitromethylpropyl)amino]1,10-decyl dinitrate, etc.

Generally our process for producing our new compounds consists of nitrating a N-trinitroalkylamino alcohol to obtain a N-nitro-N-trinitroalkylamino nitrate which is then converted to a N-nitro-N-trinitroalkylamino ester. The ester is, if desired, in turn converted to the N-nitro-N-trinitroalkylamino alcohol by subjecting it to acid hydrolysis.

As indicated above, the first step in our process is concerned with the nitration of a N-trinitroalkylamino alcohol to obtain a N-nitro-N-trinitroalkylamino nitrate. The nitration of the N-trinitroalkylamino alcohol is carried out using nitric acid as the nitrating agent, generally in the form of a nitrating mix with sulfuric acid, acetic anhydride or other dehydrating agent. Generally, we prefer to carry out the nitration reaction at temperatures ranging from about 5 to 25° C. Following completion of the nitration reaction, we can generally obtain the N-nitro-N-trinitroalkylamino nitrate as a solid by cooling the reaction mixture to a temperature of about 0° or below, or by pouring the reaction mixture over ice. The resulting product can be recrystallized by dissolving in nitric acid and then cooling to the low temperatures indicated. This can be done several ways, including by pouring the nitric acid solution over ice.

The N-trinitroalkylamino alcohol which is nitrated according to the above procedure can be employed as such or it can be produced in situ by the reaction of nitroform with an aldehyde such as formaldehyde, acetaldehyde, etc. and an amino alcohol or amino glycol such as ethanolamine, 3-amino-1-propanol, 2-methyl - 2 - amino-1,3-propanediol, 2-amino-1,4-butanediol, etc. We prefer to produce the N-trinitroalkylamino alcohol in situ by reacting nitroform with the desired aldehyde and the desired amino alcohol or amino glycol at low temperature in aqueous solution.

Generally, the alcohols used to form nitrates have the following structural formula:

$$R^3-\underset{R^7}{\underset{|}{\overset{R^6}{\overset{|}{C}}}}-R^5$$

wherein $R^1$ is selected from the group consisting of

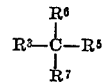—CH, 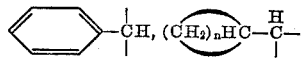

and alkylene having up to 5 carbon atoms; $R^3$ is selected from the group consisting of hydrogen and alkyl having up to 5 carbon atoms

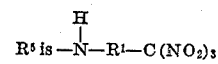

$R^6$ is hydroxyalkyl having up to five carbon atoms and $R^7$ is hydrogen, alkyl having up to five carbon atoms, R substituted alkyl, hydroxyalkyl having up to ten carbon atoms and R and hydroxy substituted alkyl having up to ten carbon atoms.

The N-nitro-N-trinitroalkylamino nitrate can be converted to a N-nitro-N-trinitroalkylamino ester by reacting the same with an esterifying agent such as acetic anhydride in the presence of an acid such as sulfuric acid. The reaction is carried out at low temperatures ranging from about 0 to about 30° C. The ester can ordinarily be recovered by cooling the reaction mixture to a temperature of about 0° or below as by pouring the reaction mixture over ice. Generally, the ester is obtained as an oily liquid and it is generally desirable to dry the same by any convenient means such as, for example, dissolving the oily layer in ether, adding magnesium sulfate as a drying agent, removing the drying agent, and then removing the ether by distillation.

Our new nitrate compounds are useful as explosives and can be converted to polymer forming alcohols by the process set out in our co-pending U.S. Serial 767,746.

The N-nitro-N-trinitroalkylamino ester can be converted to the corresponding alcohol by hydrolysis in the usual manner. Acids such as hydrochloric, sulfuric, etc. can be employed and generally we prefer to employ reflux temperatures for carrying out the hydrolysis of the ester to obtain the alcohol. Generally, we prefer to conduct the hydrolysis in the presence of an inert solvent such as a lower alkyl alcohol. Following the reaction, the solvent can be removed by distilling in vacuo to obtain the alcohol as an oily liquid which in some instances crystallizes upon cooling. In some instances it is necessary to dissolve the oily product in a suitable solvent such as ether, and then remove the solvent by distillation in vacuo to obtain a product oil which crystallizes upon cooling. In other instances, it is necessary to dissolve the oily product in a suitable solvent such as, for example, ether and then crystallize the same by addition of hexane or other suitable material to the ether solution. Ordinarily, the product can be recrystallized from suitable solvent such as, for example, carbon tetrachloride, ethylene dichloride, etc.

The following examples are offered to illustrate our invention. However, we do not intend to be limited to the specific proportions, procedures, and materials described. Rather we intend to include within the scope of our invention all equivalents obvious to those skilled in the art.

Example I

A solution composed of 10.5 grams of 2-methyl-2-amino-1,3-propanediol, 15.1 grams of trinitromethane, and 8.5 ml. of 37% formalin solution in 35 ml. of distilled water was prepared and held at ice bath temperatures for several hours after which the water was removed by aerating the solution at 25° C. The residual oil was dissolved in ethyl alcohol and the solution dried over magnesium sulfate after which the ethyl alcohol was removed by distillation in vacuo leaving 2-methyl-2-(N-trinitroethylamino)-1,3-propanediol as a heavy oil. The oily product was dissolved in 50 ml. of acetic anhydride and the solution cooled to 5° C. after which 30 ml. of fuming nitric acid was added to the cooled solution over a period of one and one-half hours, the temperature being kept below 20° C. at all times. The mixture was then stirred at 5 to 15° C. for two hours and poured over crushed ice to precipitate 2-methyl-2-(N-nitro-N-trinitroethylamino)-1,3-propyl dinitrate as a heavy oil. The oily nitrate product was dissolved in 100 ml. of ether, the solution washed with two 100 ml. portions of water and dried with magnesium sulfate after which the ether was removed in vacuo and the oily dinitrate dissolved in 100 ml. of acetic anhydride, cooled to 5° C. and stirred vigorously while 6 ml. of concentrated sulfuric acid was added in small portions maintaining the temperature below 20° C. The mixture was poured over crushed ice to give a red oil which was dissolved in 100 ml. of ethylene dichloride and the solution washed with water and dried with magnesium sulfate. The solvent was then removed in vacuo to give a reddish impure solid which was triturated with methanol and the solid 2-methyl-2-(N-nitro-N-trinitroethylamino)-1,3- propyl diacetate removed. Melting point 75–75.5° C. *Analysis.*—Calculated: N=17.6. Found: N=17.65. A 7.2 gram portion of crude 2-methyl-2-(N-nitro-N-trinitroethylamino)-1,3-propyl diacetate was dissolved in a mixture of 100 ml. of methanol and 5 ml. of concentrated hydrochloric acid and the solution heated under reflux for two hours. Removal of the solvents in vacuo left a solid that was recrystallized from carbon tetrachloride to yield pure white 2-methyl-2-(N - nitro - N - trinitroethylamino) - 1,3 - propanediol having a melting point of 115–117° C. with decomposition. *Analysis.*—Calculated: N=22.4. Found: N=22.2.

Example II

A mixture of 25 ml. of concentrated sulfuric acid and 25 ml. of fuming nitric acid was cooled to approximately 15° C. and to the mixture was added 7.6 grams of 2-(N-trinitroethylamino)ethanol. The mixture was stirred at 15–25° C. for approximately two hours after which it was poured over crushed ice to produce a solid that was purified by dissolving in fuming nitric acid followed by precipitation over crushed ice. The product was dried in vacuo at 25–30° C. and recrystallized from 30 ml. of ethylene dichloride. The product 2-(N-nitro-N-trinitroethylamino)ethyl nitrate had a melting point of 105–106° C. with decomposition. *Analysis.*—Calculated: N=26.8. Found: N=26.4.

Example III

A 3-gram portion of 2-(N-nitro-N-trinitroethylamino)-ethyl nitrate was dissolved in 30 ml. of acetic anhydride and the solution cooled and stirred vigorously. To the solution 3 ml. of concentrated sulfuric acid was added so that the temperature never exceeded 15° C. and after the addition of the acid was complete the mixture was allowed to stir for approximately 5 hours at 0–5° C. and then for an additional hour while the temperature rose to about 30° C. The mixture was then poured over crushed ice to obtain an oil which was taken up in 100 ml. of ether, the solution washed with four 50 ml. portions of distilled water, dried over magnesium sulfate, and the ether then removed in vacuo to leave the oily 2-(N-nitro-N-trinitroethylamino)ethyl acetate. The ester was dissolved in a mixture of 30 ml. of methanol and 3 ml. of concentrated hydrochloric acid and the solution refluxed for about two hours. The solvent was then removed in vacuo to leave an oil that solidified when two 10–15 ml. portions of ether were added and subsequently removed in vacuo. The material was recrystallized from carbon tetrachloride to give 2-(N-nitro-N-trinitroethylamino)-ethanol as a white solid, melting point 74° C. *Analysis.*—Calculated: N=26.0%. Found: N=26.2%.

Our new compounds are useful as explosives and particularly the N-nitro-N-trinitroalkylamino nitrates which are particularly powerful explosives in themselves. In addition, the N-nitro-N-trinitroalkylamino alcohols and glycols can be converted into compounds which are also very valuable as explosives. For example, our N-nitro-N-trinitroalkylamino glycols can be converted into polymers such as polynitro esters and polynitro urethanes by treating them with dibasic acids and diisocyanates, respectively. They can also be converted in a dehydration reaction to diolefins which can be polymerized directly, and this can also be achieved with our N-trinitroalkylamino alcohols. These polymers are useful as rocket propellants possessing a high specific impulse.

The following example is offered to illustrate the conversion of our new N-nitro-N-trinitroalkylamino alcohols into further very powerful explosives.

Example IV

A 1.07 gram portion of 2-(N-nitro-N-trinitroethylamino)ethanol, 1.0 gram of 4,4,4 - trinitrobutyryl chloride and 0.55 gram of aluminum chloride were dissolved in 30 ml. of ethylene dichloride and the solution heated at about 50° C. for about 18 hours. The solution was then poured over a mixture of 16 ml. of concentrated hydrochloric acid and 30 grams of crushed ice. After the ice had melted, the aqueous layer was washed with six 15 ml. portions of ethylene dichloride and these extracts combined with the original ethylene dichloride layer which was then washed with three 20 ml. portions of water, dried with magnesium sulfate and concentrated to 15 ml. in vacuo. An oil remained which after addition of hexane solidified at −10° C. to produce 2 - (N - nitro - N - trinitroethylamino)ethyl - 4,4,4- - trinitrobutyrate melting at 40–43° C.

This is a continuation-in-part of our U.S. Patent application Serial No. 713,512, filed February 5, 1958, now abandoned, which is in turn a division of our U.S. Serial No. 646,176, filed March 14, 1957, now abandoned, the former of said cases was co-pending.

Now having described our invention, what we claim is:

1. Compounds having the structural formula:

wherein

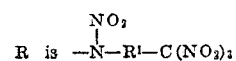

$R^1$ is selected from the group consisting of

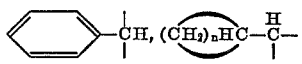

and alkylene having up to five carbon atoms; $R^2$ is nitratoalkyl having up to five carbon atoms; $R^3$ is selected from the group consisting of hydrogen, and alkyl having up to five carbon atoms; $R^4$ is selected from the group consisting of hydrogen, alkyl having up to five carbon atoms, R substituted alkyl, nitratoalkyl having up to ten carbon atoms and R- and nitrato substituted alkyl having up to ten carbon atoms; and $n$ is a number from three to nine.

2. 2-(N-nitro-N-trinitroethylamino)ethyl nitrate.

3. 3-(N-nitro-N-trinitroethylamino)-1-propyl nitrate.

4. 2-methyl-2-(N-nitro-N-trinitroethylamino)-1,3-propyl dinitrate.

5. 2-(N-nitro-N-trinitroethylamino)-1,4-butyl dinitrate.

6. A process for preparing N-nitro-N-trinitroalkyl amino nitrates which comprises contacting an amino alcohol having the structural formula:

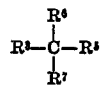

wherein $R^1$ is selected from the group consisting of

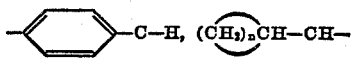

and alkylene having up to 5 carbon atoms; $R^3$ is selected from the group consisting of hydrogen and alkyl having up to 5 carbon atoms;

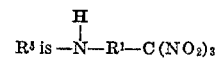

$R^6$ is hydroxyalkyl having up to five carbon atoms; and $R^7$ is selected from the group consisting of hydrogen, alkyl having up to five carbon atoms, R substituted alkyl, hydroxyalkyl having up to ten carbon atoms and R and hydroxy substituted alkyl having up to ten carbon atoms; with nitric acid in the presence of a dehydrating agent.

7. The process which comprises contacting 2-(N-trinitroethylamino)ethanol with nitric acid in the presence of a dehydrating agent to obtain 2-(N-nitro-N-trinitroethylamino)ethyl nitrate.

8. The process which comprises contacting 3-(N-trinitroethylamino)-1-propanol with nitric acid in the presence of a dehydrating agent to obtain 3-(N-nitro-N-trinitroethylamino)-1-propyl nitrate.

9. The process which comprises contacting 2-methyl-2-(N-trinitroethylamino)-1,3-propanediol with nitric acid in the presence of a dehydrating agent to obtain 2-methyl-2-(N-nitro-N-trinitroethylamino)-1,3-propyl dinitrate.

10. The process which comprises contacting 2-(N-trinitroethylamino)-1,4-butanediol with nitric acid in the presence of a dehydrating agent to obtain 2-(N-nitro-N-trinitroethylamino)-1,4-butyl dinitrate.

No references cited.